E. MONTECINO.
APPARATUS FOR FILTERING SUGAR CANE JUICES.
APPLICATION FILED DEC. 29, 1909.
980,815.
Patented Jan. 3, 1911.
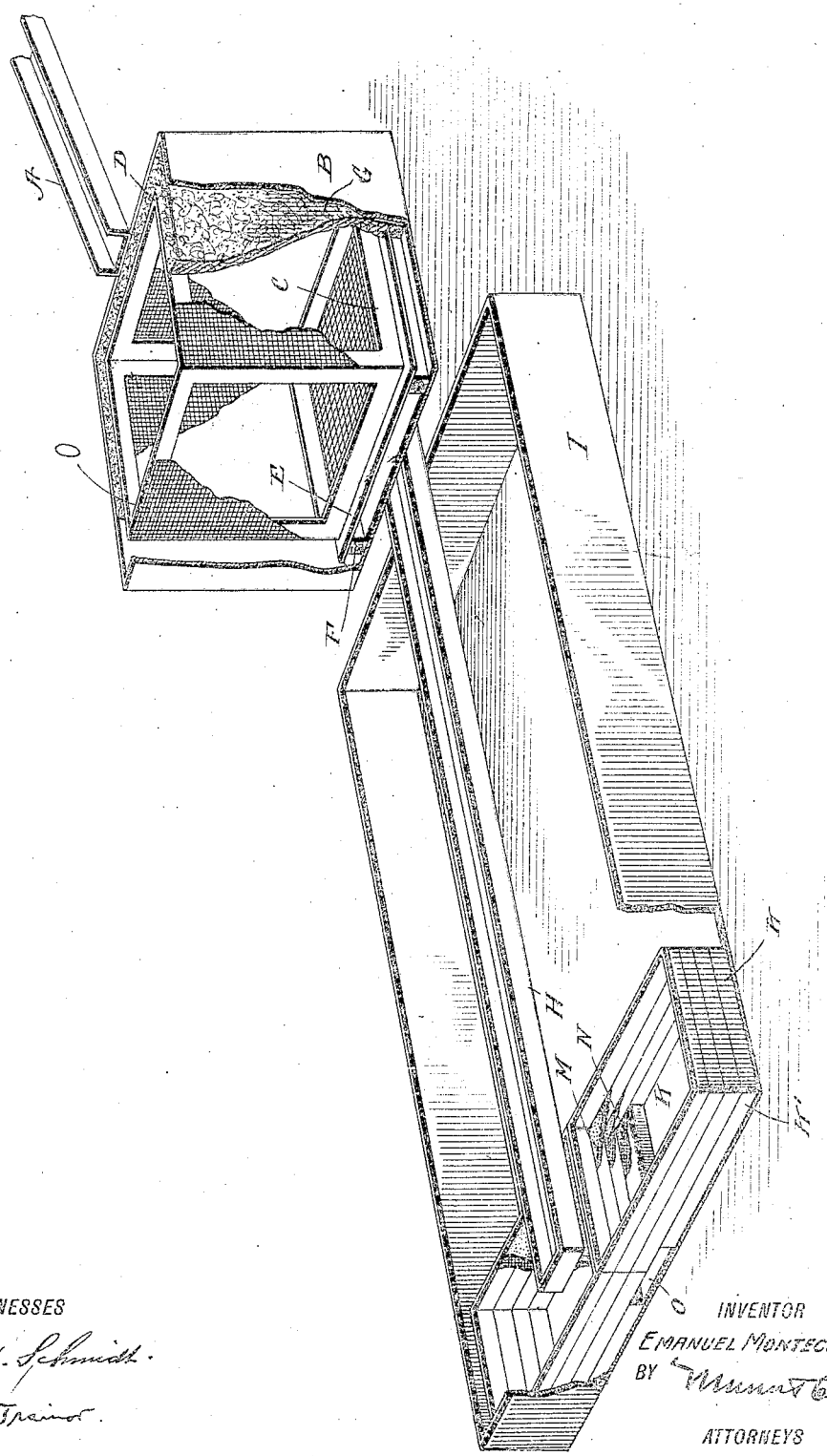
WITNESSES
L. H. Schmidt
C. E. Trainor
INVENTOR
EMANUEL MONTECINO
BY Munn & Co.
ATTORNEYS

UNITED STATES PATENT OFFICE.

EMANUEL MONTECINO, OF RACELAND, LOUISIANA.

APPARATUS FOR FILTERING SUGAR-CANE JUICES.

980,815. Specification of Letters Patent. Patented Jan. 3, 1911.

Application filed December 29, 1909. Serial No. 535,428.

*To all whom it may concern:*

Be it known that I, EMANUEL MONTECINO, a citizen of the United States, and a resident of Raceland, in the parish of Lafourche and State of Louisiana, have made certain new and useful Improvements in Apparatus for Filtering Sugar-Cane Juices, of which the following is a specification.

My invention is an improvement in apparatus for filtering sugar cane juice, and consists in certain novel constructions and combinations of parts, hereinafter described and claimed.

The object of the invention is to provide an apparatus of the character specified which will eliminate a maximum of impurities from the juice, and which will produce a better quality of sugar from the same grade of juice.

In the drawings the improvement is shown in perspective, parts being broken away to better show the interior structure.

In the present embodiment of the invention, the juice passes from the mill by means of the trough A, and is delivered into a tank or vat B, within which is a filter box having open sides and an open bottom, and of lesser size than the tank, so that there is a space between each wall of the box and the corresponding wall of the tank. The said box is formed of five open frames C, joined at their edges to form an open top box, into which the trough A delivers. Each of the frames is covered with two layers of wire gauze O secured to the frame in any suitable manner, and the tank B is provided with a false bottom E upon which the box rests. The false bottom is supported by bars F, one arranged near each end of the tank and in the space between each side wall of the box and the corresponding wall of the tank, is a filtering pad G, the said pad being continuous, and entirely encircling the box. The pad extends from the top to the bottom of the tank, but the space between the floor and the false floor is vacant as shown.

A distributing trough H, leads from the tank B to a second tank or vat I, the vat I being at a lower level than the tank B, and the trough extends the full length of the vat. The tank B is provided with an opening in its bottom delivering into the trough, and the trough is provided with openings throughout its length delivering to the vat I. The vat I is filled with filtering frames, K, arranged in superposed series, preferably five frames in each series, and the height of the side wall of the vat is such that the edge of the upper frame is flush with the edge of the wall. Only the two series at the end of the vat remote from the tank are shown, and the top frame of each series is removed. The size of the frames with respect to the vat is such that the entire cubical contents of the vat is occupied by the frames, as for instance in a vat 15x10x4 inside measure, there would be 50 frames 5x3 outside measure, and the bottom frame K' is of lesser length than the upper frames, in order that the juice may readily pass out at the bottom. Each of the frames K is open, and the bottom is covered with a layer M of wire gauze of suitable mesh, and with a layer N of hemp or agave or other suitable material, the layer N being above the layer M. Each of the frames on each side of the vat has its outer end in contact with the side wall, and on account of the lower frame being of lesser length a passage O is formed the entire length of the vat.

The above described apparatus is interposed between the mill and the evaporator, and preferably a portion of the molasses of each strike is passed from the centrifugal to the tank B and caused to undergo another filtration with the new juice. The tank B may also be arranged in front of the evaporator or resting tank, to filter the material passing into the tank, whereby to eliminate the gum from the syrup in order to obtain a larger amount of sugar per ton.

With the improved apparatus interposed as stated, the necessity of skimming is dispensed with, since the juice is filtered before cooking, and since there is no pressure the coloring matter of the cane will not express to discolor the juice. If desired sulfur may be used to discolorize the juice when the juice leaves the vat.

I claim—

1. An apparatus of the character specified, comprising a tank having an open top, a false bottom in the tank and spaced above the true bottom, a box resting on the false bottom, said box having open sides and an open bottom, a double layer of wire gauze covering said sides and bottom, a filter pad encircling the side walls of the box and between said walls and the walls of the tank, a distributing trough below the tank and to which it delivers, a vat, said trough extending the full length of the vat at approximately its longitudinal center, and having openings for delivering the juice to the vat, and a plurality of filter frames in the vat, said frames being arranged in superposed series, the series being arranged in rows one on each side of the trough, and occupying the entire space within the vat, each of said frames having a bottom composed of a layer of wire gauze and a layer of hemp or agave, the bottom frame of each series being of lesser length than the upper frames and spaced apart from the corresponding frame on the opposite side of the vat to form a passage at the center of the vat.

2. An apparatus of the character specified, comprising a tank having an open top, a false bottom in the tank and spaced above the true bottom, a box resting on the false bottom, said box having open sides and an open bottom, a layer of wire gauze covering said sides and bottom, a filter pad encircling the side walls of the box and between said walls and the walls of the tank, a distributing trough below the tank and to which it delivers, a vat, said trough extending the full length of the vat at approximately its longitudinal center, and having openings for delivering the juice to the vat, and a plurality of filter frames in the vat, said frames being arranged in superposed series, the series being arranged in rows one on each side of the trough, and occupying the entire space within the vat, each of said frames having a bottom composed of a layer of wire gauze and a layer of hemp or agave, the bottom frame of each series being of lesser length than the upper frames and spaced apart from the corresponding frame on the opposite side of the vat to form a passage at the center of the vat.

3. In an apparatus of the character specified, a tank, a false bottom in the tank and spaced above the true bottom, a box having open sides and an open bottom resting on the false bottom, a covering of wire gauze on each side of the bottom, the sides of the box being spaced apart from the sides of the tank, and a filter pad between each wall of the box and the corresponding wall of the tank.

4. In an apparatus of the character specified, a tank, a box having open sides and an open bottom supported on the tank, the walls and the bottom of the box being spaced from the walls and bottom of the tank, a covering of gauze for the walls and bottom of the box, and a filter pad between the corresponding walls of the box and tank.

5. In an apparatus of the character specified, a tank and a box having perforate sides and a perforate bottom supported in the tank with the walls and bottom of the box spaced apart from the walls and bottom of the tank, and a filter pad between the corresponding walls of the box and tank.

6. In an apparatus of the character specified a filter tank comprising a plurality of series of superposed substantially rectangular frames, the frames of one series being arranged with their ends abutting the ends of the frames of the other series, each of said frames having a covering, said covering comprising a layer of wire netting, and a layer of hemp or agave over the netting, and a pan in which the frames are arranged, the lowermost frame of each series being of lesser length than the other frames, and spaced apart from the corresponding frame of the other series.

7. In an apparatus of the character specified a filter tank comprising a plurality of series of superposed substantially rectangular frames, the frames of one series being arranged with their ends abutting the ends of the frames of the other series, each of said frames having a covering, said covering comprising a layer of wire netting, and a layer of hemp or agave and a pan in which the frames are arranged.

8. In an apparatus of the character specified, a filter tank comprising a plurality of series of superposed substantially rectangular frames the frames of one series being arranged with their ends abutting the ends of the frames of the other series, each of said frames having a covering, said covering comprising a layer of wire netting, and a layer of hemp or agave.

EMANUEL MONTECINO.

Witnesses:
W. T. BUSH,
W. M. HAMLET.